(12) United States Patent
Robin

(10) Patent No.: US 7,137,068 B1
(45) Date of Patent: Nov. 14, 2006

(54) APPARATUS AND METHOD FOR AUTOMATICALLY POSITIONING A CURSOR ON A CONTROL

(75) Inventor: Michael B. Robin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/052,278
(22) Filed: Mar. 30, 1998

Related U.S. Application Data

(62) Division of application No. 08/209,166, filed on Mar. 10, 1994, now Pat. No. 5,808,604.

(51) Int. Cl.
*G06F 17/00* (2006.01)
*G06F 3/00* (2006.01)
*G11B 27/00* (2006.01)

(52) U.S. Cl. .................. 715/700; 715/719; 715/835; 715/837; 715/840

(58) Field of Classification Search ........... 345/324, 345/145, 340, 157, 339, 121, 354, 326–328, 345/835, 845, 719–725, 764, 772, 810, 821, 345/823–24, 840, 804–805, 700, 809, 856, 345/763, 503, 837
See application file for complete search history.

(56) References Cited

U.S. PATENT DOCUMENTS

| | | | |
|---|---|---|---|
| 4,803,474 A | 2/1989 | Kulp | 340/709 |
| 4,954,818 A | 9/1990 | Nakane et al. | 345/120 |
| 4,987,411 A | 1/1991 | Ishigami | 340/709 |

(Continued)

FOREIGN PATENT DOCUMENTS

| EP | 0 467 7201 | 1/1992 |
|---|---|---|

(Continued)

OTHER PUBLICATIONS

"Methodology for Marking Objects Using a Polar Coordinate Point and Shoot Cursor," IBM © Technical Disclosure Bulletin, vol. 35, No. 6, Nov. 1992, pp. 310-311.

(Continued)

*Primary Examiner*—Kee M. Tung
*Assistant Examiner*—Chante Harrison
(74) *Attorney, Agent, or Firm*—Lee & Hayes, PLLC

(57) ABSTRACT

A method and apparatus for managing controls on the screen of a computer controlled display. The preferred embodiment of the present invention provides for quick and efficient activation and deactivation of controls by designating a number of controls as a control grouping. The preferred embodiment then collectively activates or deactivates the designated number of controls using an identifier for the control grouping. Additionally, after a user terminates cursor movement, the preferred embodiment automatically positions a cursor on an ideal control. The preferred embodiment determines the ideal control (1) by removing from consideration any controls which are (a) not visible to the user, or (b) located at non-optimal positions on the screen, and (2) by calculating a weighted distance for each remaining control. The preferred embodiment calculates the weighted distances by comparing the previous cursor movements made by a user with application specified parameters. After calculating a weighted distance for each remaining control, the preferred embodiment automatically positions the cursor on the control having a smallest associated weighted distance.

7 Claims, 11 Drawing Sheets

U.S. PATENT DOCUMENTS

| | | | |
|---|---|---|---|
| 5,195,179 A | 3/1993 | Tokunaga | 395/161 |
| 5,214,414 A | 5/1993 | Levine et al. | 345/157 |
| 5,263,134 A | 11/1993 | Paal et al. | 395/158 |
| 5,298,890 A | 3/1994 | Kanamaru et al. | 345/157 |
| 5,499,040 A * | 3/1996 | McLaughlin et al. | 345/146 |
| 5,510,811 A | 4/1996 | Tobey et al. | 345/157 |
| 5,570,108 A * | 10/1996 | McLaughlin et al. | 345/146 |
| 5,815,153 A * | 9/1998 | Isensee et al. | 345/354 |
| 5,828,376 A * | 10/1998 | Solimene et al. | 345/354 |
| 5,880,729 A * | 3/1999 | Johnston et al. | 345/354 |
| 5,889,522 A * | 3/1999 | Chew et al. | 345/354 |
| 5,977,970 A * | 11/1999 | Amro et al. | 345/340 |
| 5,995,103 A * | 11/1999 | Ashe | 345/346 |
| 6,016,144 A * | 1/2000 | Blonstein | 345/342 |
| 6,018,340 A * | 1/2000 | Butler et al. | 345/339 |

FOREIGN PATENT DOCUMENTS

| | | |
|---|---|---|
| JP | 3048922 | 3/1991 |
| JP | 3051892 | 3/1991 |
| JP | 3292524 | 12/1991 |
| JP | 4186290 | 7/1992 |
| JP | 6289834 | 10/1994 |
| WO | WO 93/22758 | 11/1993 |

OTHER PUBLICATIONS

U.S. Appl. No. 08/206,543, filed Mar. 4, 1994, Brewer et al.

* cited by examiner

APPARATUS AND METHOD FOR AUTOMATICALLY POSITIONING A CURSOR ON A CONTROL

RELATED APPLICATIONS

This is a divisional of U.S. patent application Ser. No. 08/209,166, filed Mar. 10, 1994, which is now U.S. Pat. No. 5,808,604.

TECHNICAL FIELD

The present invention relates to the field of computer-controlled displays and, more particularly, to an apparatus and method for designating control groupings and automatically positioning a cursor on a control.

BACKGROUND OF THE INVENTION

Computer-controlled displays are currently in widespread use in both home and business environments. Moreover, due to the price drop of microprocessors in recent years, computer-controlled displays are being used in environments other than conventional personal computers. For example, computer-controlled displays are often used in home entertainment systems (e.g., VCRs, video games or other types of interactive television systems). However, because these systems typically lack both sophisticated pointing devices and full-size keyboards, cursor control is problematic. Cursor control refers to the ability of a user to move a cursor to a specified location on the computer-controlled display. The term "cursor" as used herein includes any form of movable marker such as an arrow, a screen highlight, a screen focus, or the like.

FIG. 1 illustrates a computer system 105 of a typical home entertainment device. Typically, the home entertainment device features a computer 110, an input device 120, and a video display device 170. Additionally, the computer 110 contains a receiver 130, a memory 140, a central processing unit (CPU) 150, and a display driver 160. These components are interconnected as shown.

The input device 120 includes a directional control device 122 (e.g., a joystick, an arrow keypad, a mouse) and a control switch 124 (e.g., an action button, a function button, or a mouse click-button). By actuating the directional control device 122, a user can move a cursor 172 on the screen of the video display device 170. Similarly, by releasing the directional control device 122, the user terminates cursor movement. The phrase "releasing the directional control device" as used herein refers to any process for deactivating a directional control device 122, so that the directional control device 122 no longer effects cursor movement. The screen of the video display device is logically divided into discrete points. Each discrete point is addressable by Cartesian coordinates (X, Y). The screen of the video display device 170 displays a number of controls 174. Each control 174 is a child window that occupies a defined area of the video display device 170 and is used to input instructions to a computer program 142 running on the computer system 110. Typically, the computer program 142 is contained within the memory 140 of the computer system 110. Generally, the controls are maintained in one of two states, (1) active (indicating that an option represented by the control 174 is currently available to the user), or (2) inactive (indicating that an option represented by the control 174 is currently unavailable to the user).

Typically, a software programmer decides which controls of a given window should be active or inactive, depending upon the state of the program. For example, in the VCR Programming Options Window 205 of FIG. 2A, the controls 220, 222 and 224 with double borders are active while the controls 230, 232 and 234 with the single borders are inactive. In this case, the Play control 230, Fast Forward control 232 and Rewind control 234 are inactive due to the "ON" status of the Timer ON/OFF control 220. In conventional systems, the software programmer has to individually activate or deactivate a given control. To disable only a fraction of the currently active controls, the programmer selectively deactivates each of the controls. Such selective deactivation is cumbersome.

To invoke an option represented by an activated control, the user positions the cursor 172 on the desired activated control and actuates the control switch 124. By actuating the control switch 124 (e.g., by depressing an action button), the user directs the computer program 142 to execute the desired option. However, as previously discussed, most home entertainment systems do not have a sophisticated pointing device (such as a mouse) for a directional control device 122. Instead, the directional control device 122 is frequently a joy stick or a simple four-directional control device. As a result, positioning the cursor 172 on the desired control 172 is a difficult process for the user.

In conventional systems, positioning the cursor is accomplished by "tabbing" or "free-roaming." When tabbing is used, the computer system 110 maintains a hard-wired list of the controls 174. The hard-wired list of controls designates the sequence in which the user must traverse through the activated controls. As previously explained, FIG. 2A illustrates the Timer ON/OFF control 220, the Timer Set control 222, and the Set Clock control 224 as active, while illustrating the Play control 230, the Fast Forward control 232 and the Rewind control 234 as inactive. Thus, in order for a user to access the Set Clock control 224, the user must tab through the Timer ON/OFF control 220, and Timer Set control 222 before reaching the Set Clock control 224. As a result, the conventional process of tabbing is inflexible and is highly frustrating if the user accidentally tabs over a desired control.

"Free-roaming" is also a frustrating process when a crude positioning device is used. In free roaming, the user moves the cursor towards a desired control using the directional control device 122. However, because the directional control device 122 is typically a crude positioning device, the actual process of positioning the cursor on a control is difficult. For example, it is not uncommon for the user to over-shoot or under-shoot the desired control before finally placing the cursor on the desired location. Thus, neither tabbing nor free-roaming provide a desirable technique to position a cursor on a desired control of a computer-controlled display.

Positioning a cursor in conventional systems has a further complication. This complication arises because active controls frequently become obscured by subsequently displayed items. For example, the Set Time Window 250 of FIG. 2B obscures all the active controls 260 (shown in phantom form) of the VCR Programming Options Window 205. Under these conditions, conventional systems allow the user to activate the obscured controls 260 as well as the unobscured controls 251, 252, 253 and 254. Such an occurrence is undesirable as the user can inadvertently activate one of the obscured controls.

SUMMARY OF THE INVENTION

The preferred embodiment of the present invention is a control manager for activating and deactivating controls as well as positioning a cursor on an ideal control. In its preferred embodiment, the present invention allows a programmer to quickly and easily activate and deactivate controls by designating a plurality of controls as a "control grouping." Subsequently, the preferred embodiment of the present invention designates an identifier for the entire control grouping. The preferred embodiment of the present invention then quickly activates and deactivates the entire grouping by toggling a state of the identifier.

In the preferred embodiment of the present invention, the user navigates around a screen of a computer-controlled video display device by actuating a directional control device. Upon releasing the directional control device, the preferred embodiment of the present invention automatically positions the cursor on an ideal control. The preferred embodiment determines the ideal control by examining the state of an application program and the last actions of the user. More specifically, for each active control, the preferred embodiment determines if the control is (1) obscured by a subsequently displayed item or (2) positioned at a location that the application program has specified as invalid.

The preferred embodiment determines if the control is obscured by a subsequent item of data by comparing a registrant identifier with a current identifier. The registrant identifier identifies a portion of an application program that registered the control with the control manager. The current identifier identifies the entity (i.e., the portion of the application that registered the control) that currently surrounds the Cartesian coordinates that define the control. For brevity, the Cartesian coordinates that define the control will be referred to as the "control position." If the registrant identifier does not match the current identifier, the preferred embodiment recognizes that the control is obscured. The preferred embodiment implicitly designates all obscured controls as controls which do not constitute a valid resting position for the cursor.

The preferred embodiment determines if a control is positioned at a location that the application program has specified as invalid by comparing a last cursor position with the control position. The last cursor position is defined by the Cartesian coordinates that the cursor pointed to when the user released the directional control device. The preferred embodiment then calculates a Control Distance and a Control Angle. The Control Distance is the absolute distance of a control path: the control path being a path which connects the last cursor position with the control position. The Control Angle is the angle formed between the control path and a Last Direction of Cursor Movement Path. The preferred embodiment compares the calculated Control Distance and Control Angle Values with respective Skip Distance and Skip Angle Values. These skip distance and skip angle values are specified by the application program. Subsequently, the preferred embodiment does not consider any control which has either a calculated Control Distance or Control Angle which is greater than the respective Skip Distance or Skip Angle.

At this point, the preferred embodiment calculates a weighted distance for each remaining control. Each weighted distance is calculated as a function of the Control Distance, the Control Angle, and an Angle Importance Weight. More specifically, the Weighted Distance is directly proportional to both the Control Distance and the Control Angle. Additionally, as the Angle Importance Weight increases, the effect given to the Control Angle in the Weighted Distance calculation is diminished while the effect given to the Control Distance is increased. After completing a Weighted Distance calculation for each remaining control, the preferred embodiment of the present invention positions the cursor on the control having the smallest Weighted Distance. In this manner, the preferred embodiment of the present invention automatically positions the cursor on the ideal activated control.

DETAILED DESCRIPTION

The preferred embodiment allows the user to initiate cursor movement by actuating a directional control device. When the user releases the directional control device, the preferred embodiment determines the position on the screen that the cursor is pointing to. Subsequently, the preferred embodiment automatically moves the cursor from the determined position to an ideal control. In this manner, the preferred embodiment allows the user to quickly jump to a desired control without forcing the user to actually navigate the cursor over the desired control cursor in this fashion. Such positioning is particularly advantageous when the user has access only to a crude positioning device (e.g., a joystick or an arrow keypad). Additionally, by permitting a programmer to designate a plurality of controls as a single control grouping, the preferred embodiment allows an application program to quickly activate and deactivate a selected number of the controls. Such selective activation and deactivation saves the application programmer from making repetitive calls to a control manager. Furthermore, the preferred embodiment provides a convenient method and apparatus for prohibiting access to controls that are covered by subsequently displayed windows or other items of data. More specifically, for each point which defines a registered control, the preferred embodiment compares a registrant identifier with a current identifier. In this manner, the preferred embodiment determines if a control has been obscured by a subsequently displayed item of data. Each of these facets of the preferred embodiment of the present invent will be explained in detail below.

Figure 3:
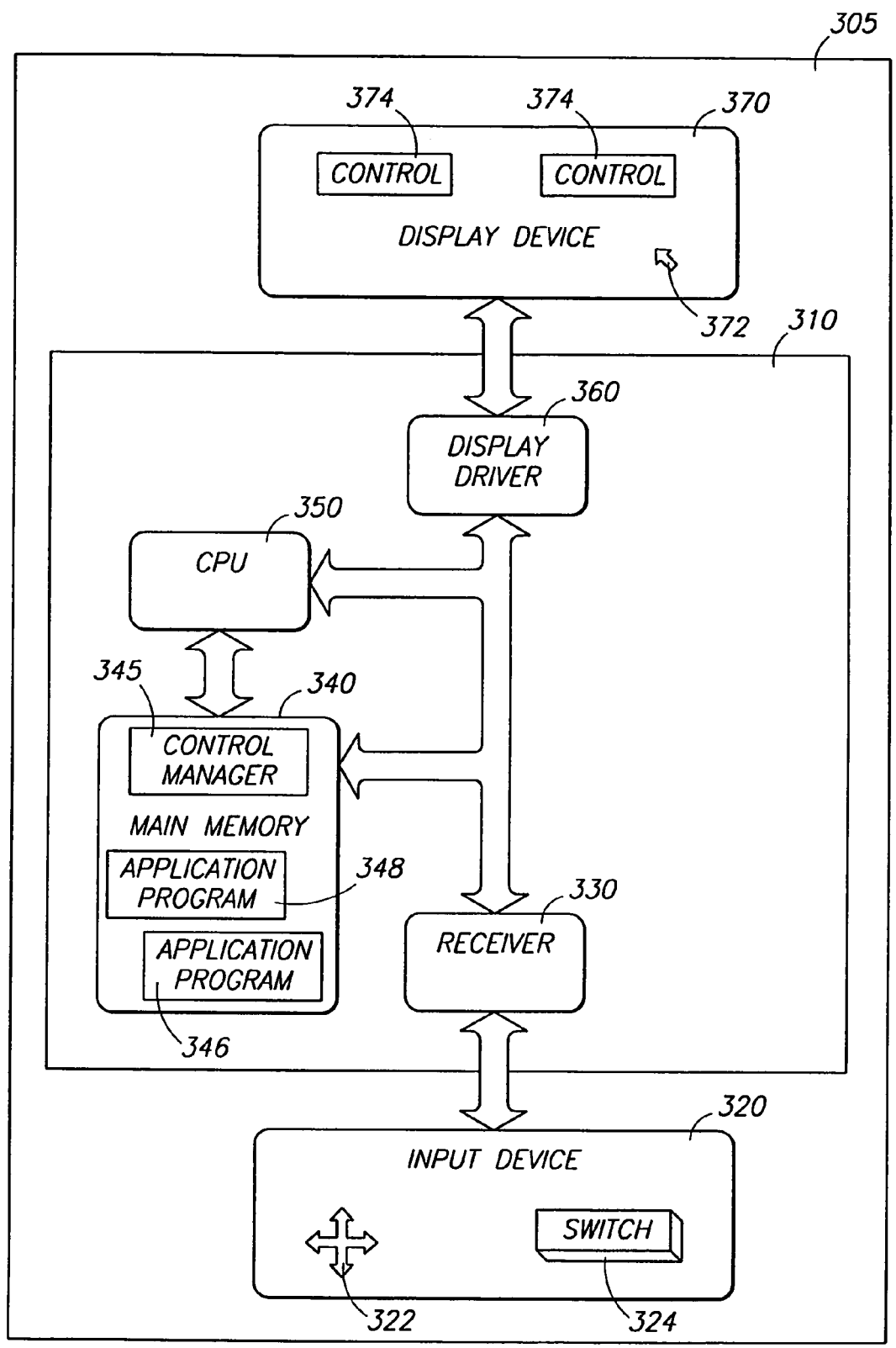
FIG. 3 is a block diagram of a computer system for practicing the preferred embodiment of the present invention.

FIG. 3 is a block diagram of a computer system 305 for practicing the preferred embodiment of the present invention. The computer system 305 features a computer 310, an input device 320, and a video display device 370. The computer 310 contains a receiver 330, a main memory 340, a central processing unit (CPU) 350, and a display driver 360. These components are interconnected as shown.

The input device 320 includes a directional control device 322. In FIG. 3, the directional control device 322 is shown as a four-arrow keypad. However, those skilled in the art will appreciate that the present invention is suitable for use with any type of directional control device (e.g., a mouse, a joystick). The directional control device 322 is used to position a cursor 372 on a control 374 of the video display device 370. Once the cursor is positioned on a control, a user may invoke the option represented by the control by depressing a function button 324. As will be explained below, in the preferred embodiment of the present invention application programs (346 and 348) register controls with a control manager 345. In brief, the process of registering a control with the control manager 345 includes informing the control manager 345 of the desired location and status information for the control. Subsequently, the control manager 345 activates and deactivates controls 374 and positions the cursor 372 among the controls 374. In FIG. 3, both the control manager 345 and the application programs (346 and 348) are shown as part of the main memory 340. However, those skilled in the art will appreciate that the control manager 345 may be located in other areas of the computer system (e.g., in the device driver 360) without departing from the spirit and scope of the present invention.

Figure 4:
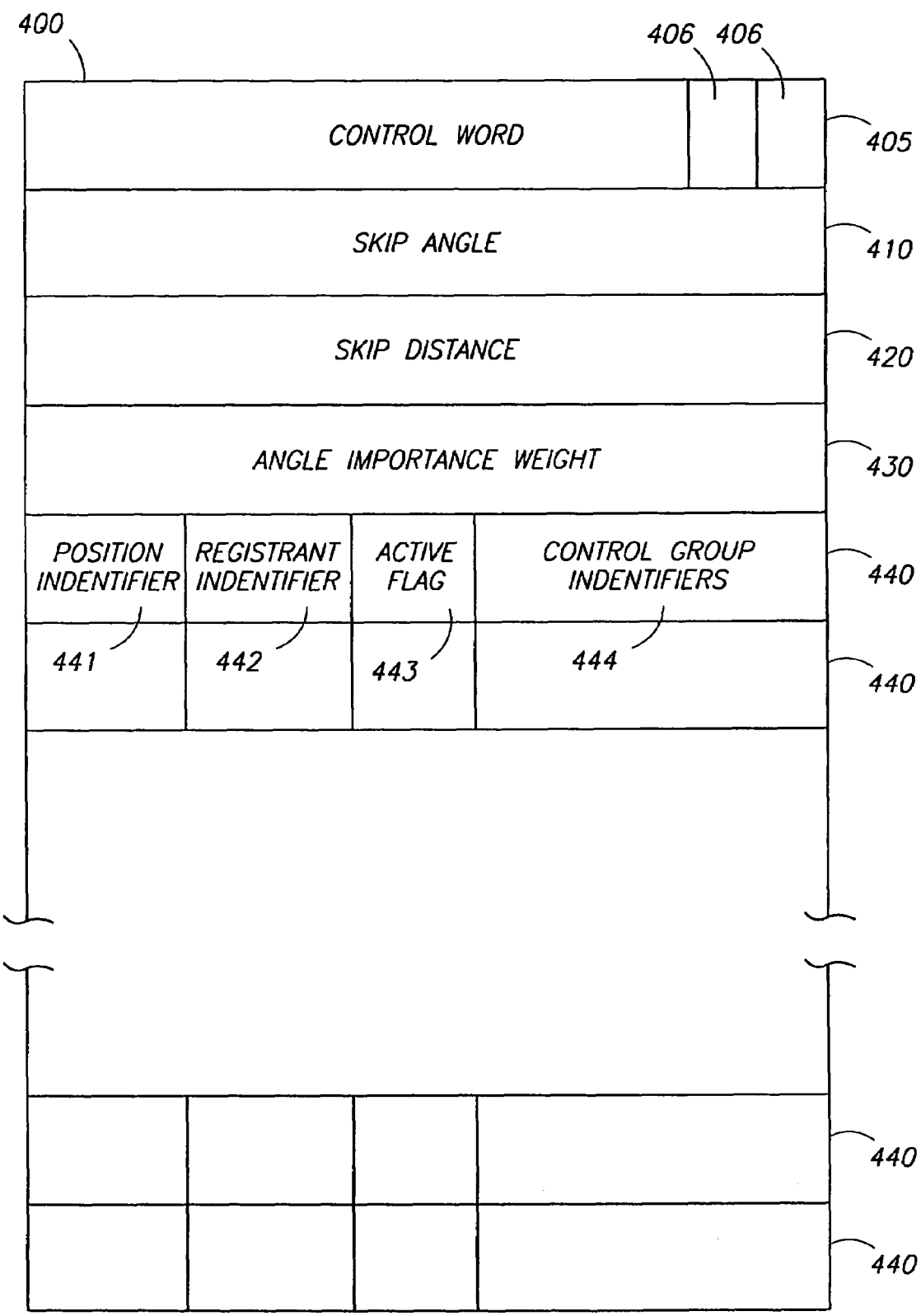
FIG. 4 illustrates a control position and status data structure for use in the preferred embodiment of the present invention.

FIG. 4 illustrates a data structure 400, associated with an application program. As will be explained below, the preferred embodiment of the present invention maintains this data structure to determine the ideal control of the application program. Those skilled in the art will appreciate that the data structure of FIG. 4 represents only one of many possible methods for storing the data explained below. For example, instead of storing the data in an array format as illustrated in FIG. 4, the data may be stored in a linked-list structure or stored in separate fields which are not aggregated together. For convenience, the data structure 400 of FIG. 4 illustrates the data used by the preferred embodiment of the present invention in a single cohesive grouping. This format was chosen to enhance the readability of the detailed description. As such, the format in which the data is presented in FIG. 4 should not be used to limit the scope of the invention.

The data structure 400 is used for managing the activation of controls 374 and positioning the cursor 372 on a control 374. The data structure includes a Control Word 405 for quickly activating and deactivating groupings of controls. The Control Word 405 includes a number of Control Grouping Indicators 406. Each Control Grouping Indicator 406 defines the status (active or inactive) for a number of aggregated controls. This number of aggregated controls is referred to as a control group. Additionally, the data structure includes three parameters which are specified by an application program 346: a Skip Angle Parameter 410, a Skip Distance Parameter 420, and an Angle Importance Weight Parameter 430. As will be explained below, the control manager 345 utilizes these three parameters to determine an ideal control 374 upon which to position the cursor 372. The data structure also includes a Control Position and Status Indicator 440 (CPSI) for each control. Each CPSI contains: (1) a Position Identifier 441 for identifying a position of a control on the screen (e.g., a set of Cartesian coordinates representing the control); (2) a Registrant Identifier 442 for identifying the entity which registered the control (e.g., a window handle identifying a registering window); (3) an Active Flag 443 for indicating an active/inactive state of the control; and (4) Control Group Identifiers 444 for identifying a membership of the control in one or more control groups.

As will be explained below, the control manager 345 inputs, from application programs 346 and 348, values for the Control Word 405, the Skip Angle Parameter 410, the Skip Distance Parameter 420, the Angle Importance Weight Parameter 430, the Position Identifier 441, and the Registrant Identifier 442. The preferred embodiment of the present invention then uses these inputted values to dynamically maintain the remaining contents of each CPSI (e.g., the Active Flag 443 and the Control Group Identifiers 444).

Figure 5:
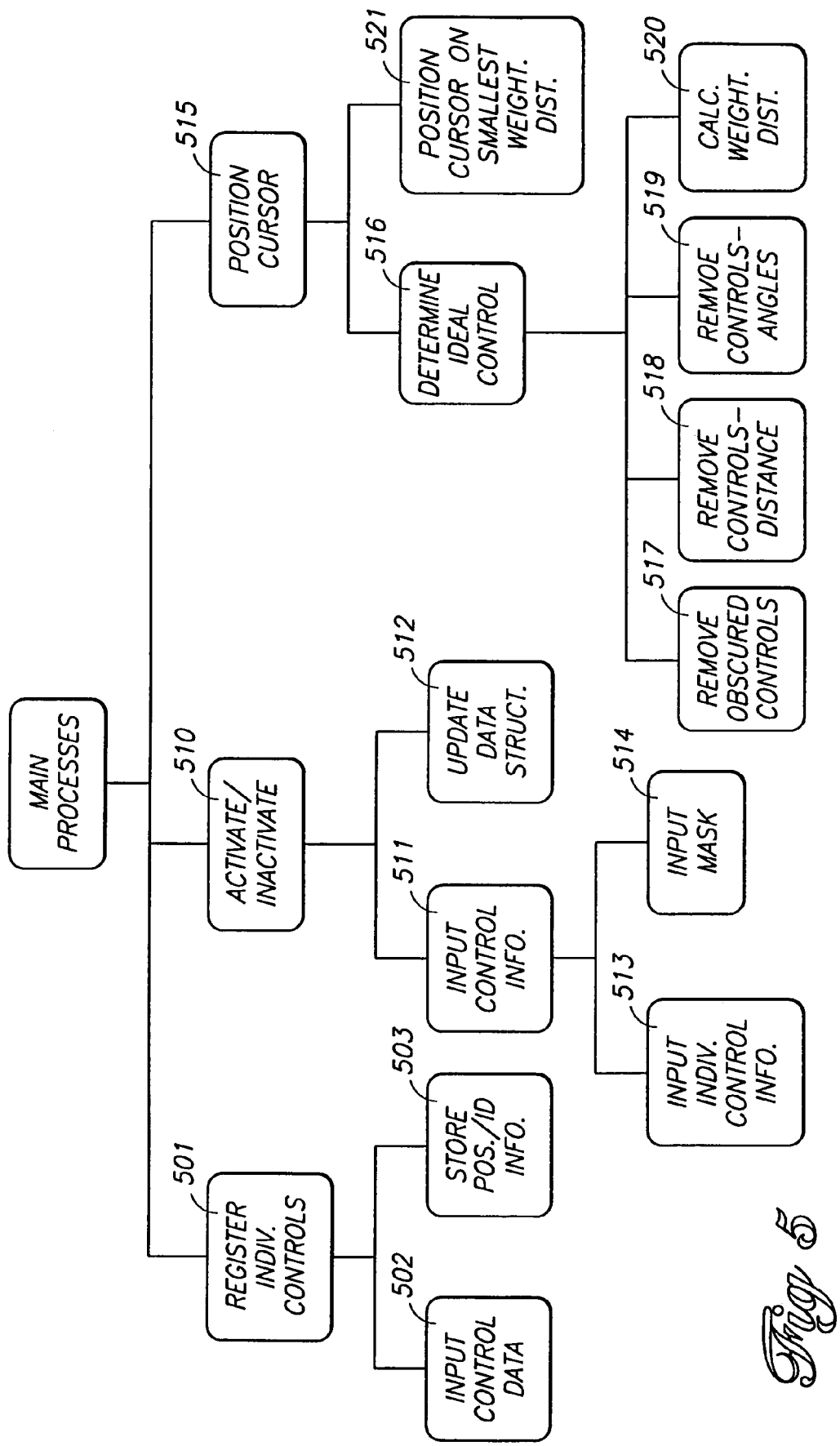
FIG. 5 is a functional block diagram illustrating the main functional components of the preferred embodiment of the present invention.

FIG. 5 is a functional block diagram illustrating the main software processes of the preferred embodiment of the present invention. The preferred embodiment of the present invention registers controls (block 501) by (1) inputting positioning information, a registrant identifier, and control group numbers from an application program 346 (block 502) and (2) storing the inputted data in the respective fields of a CPSI 440 (block 503). Similarly, the preferred embodiment activates and deactivates controls (block 510) by (1) inputting control information (block 511) and updating the Active Flags 443 of the CPSI accordingly (block 512). More specifically, the preferred embodiment may either (1) activate/deactivate individual controls by inputting individual control identifiers and active/inactive status information (block 513), or (2) activate/deactivate an entire control grouping by inputting a mask and superimposing the mask into the Control Word 405 (block 514). As will be explained below in reference to FIG. 9, this mask is a grouping of binary numbers which are used to selectively set or reset the Control Grouping Indicators 406.

The preferred embodiment of the present invention positions the cursor on an ideal control (blocks 515 and 516) by removing from consideration any controls that are (1) obscured by subsequently displayed items of data (block 517), or (2) positioned at distances or angles which, relative to the cursor's position and path, are greater than respective application-defined maximum values (blocks 518 and 519). The preferred embodiment calculates a Weighted Distance for each control which is not removed from consideration (block 520). The preferred embodiment calculates the Weighted Distance by first identifying a Last Direction of Cursor Movement Path and a Last Cursor Position. The Last Direction of Cursor Movement Path defines the direction that the user was moving the cursor 372 immediately before the user released the directional control 322. Similarly, the Last Cursor Position defines the Cartesian coordinates of a cursor pointer when the user released the directional control 322.

Having identified the Last Direction of Cursor Movement Path and the Last Cursor Position, the preferred embodiment then calculates the Weighted Distance for the control as a function of that control's Control Distance and Control Angle. As stated above, a control's Control Distance is the distance that connects the Last Cursor Position with the Control Position. The line which defines the Control Distance is referred to as the Control Path. Since both the Last Cursor Position and the Control Position are typically related by Cartesian coordinates, the Control Distance can be calculated in a straightforward manner (e.g., via a Euclidean or Manhattan distance calculation). A control's Control Angle is the angle formed between the Last Direction of Cursor Movement Path and the Control Path. Generally, the Weighted Distance of a control is directly proportional to both the Control Angle and the Control Distance. Additionally, the preferred embodiment allows the user to selectively minimize or maximize the effect given to either the Control Angle or the Control Distance by varying the previously described Angle Importance Weight 430. As will be appreciated by those skilled in the art, a variety of formulae for calculating the weighted distance of a control may be implemented without departing from the spirit or scope of the present invention. One example is the following formula which is used in the preferred embodiment of the present invention:

$$\text{Weighted Distance} = \text{Control Distance} + \frac{\text{Control Angle} * \text{Control Distance}}{\text{Angle Importance Value}}$$

After calculating Weighted Distances for each control, the preferred embodiment of the present invention positions the cursor on the control with the smallest associated Weighted Distance (block 521).

Having described an overview of the preferred embodiment of the present invention, the respective components of the preferred embodiment will now be explained in detail. The detailed discussion to follow illustrates the preferred embodiment as it is incorporated in an interactive television system. In this example, the input device 320 of FIG. 3 is a remote control and the directional control device 322 is assumed to be a four-directional arrow keypad. Additionally, in this example, the computer 310 is a VCR and the video display device 370 is a television. However, the present invention is not limited to any particular directional control device 322, computer system 310, or video display device 370.

Figure 6:
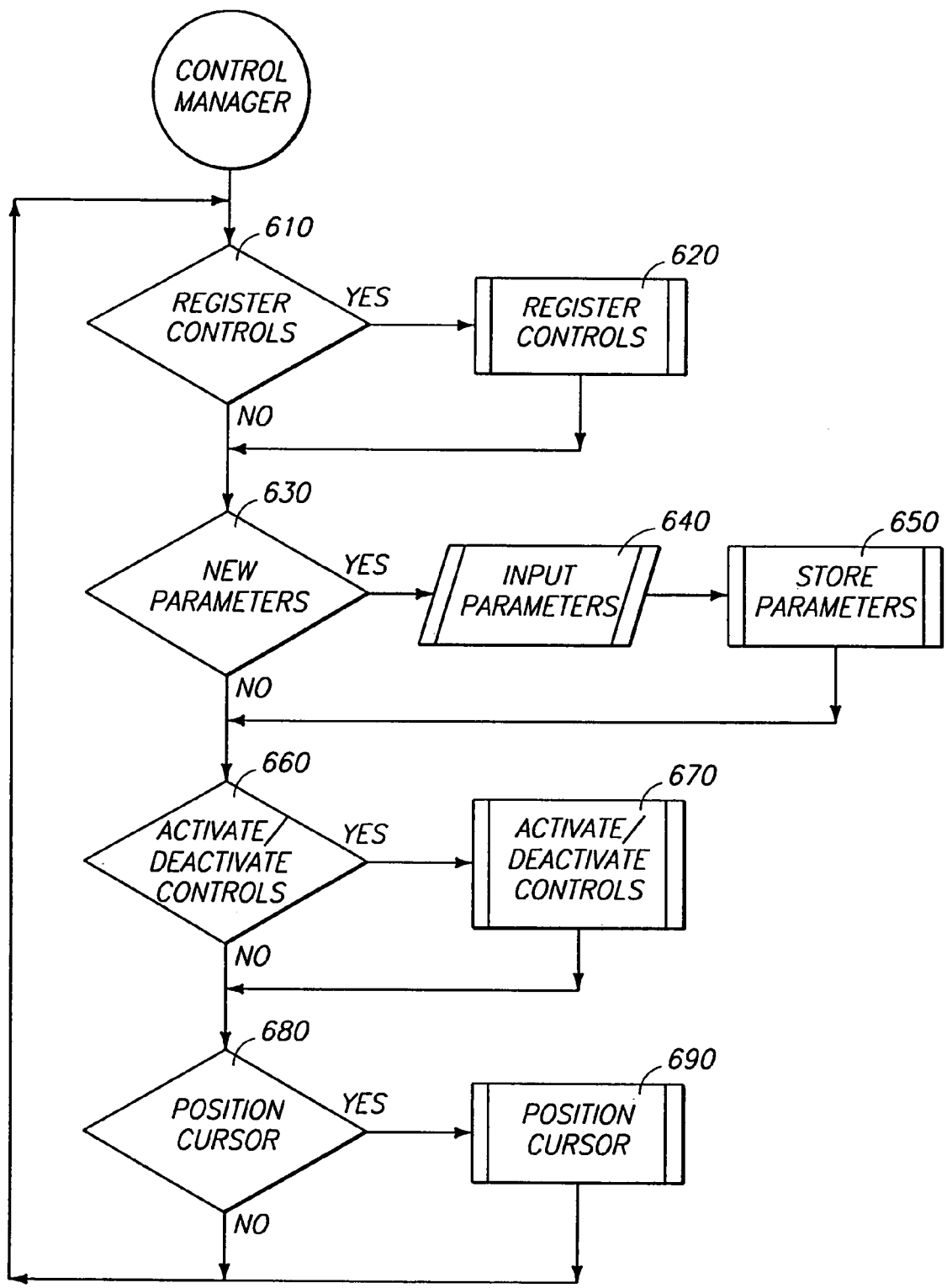
FIG. 6 is a flow diagram illustrating an overview of the steps performed in the preferred embodiment of the present invention.

FIG. 6 shows an overview of the steps performed by the control manager. In order for the preferred embodiment to direct processing control along a "YES" path of a decision step (e.g., step 610, 630, 660, or 680), the preferred embodiment must determine that the application program has requested the corresponding action. Typically, the application program 346 notifies the Control Manager Program that a given action is desired. As will be appreciated by those skilled in the art, such notification may be accomplished in any one of a number of ways (e.g., setting a request flag, calling components of FIG. 6 directly, or a hardware interrupt). The actual means of notification does not comprise a limit on the present invention.

Figure 1:
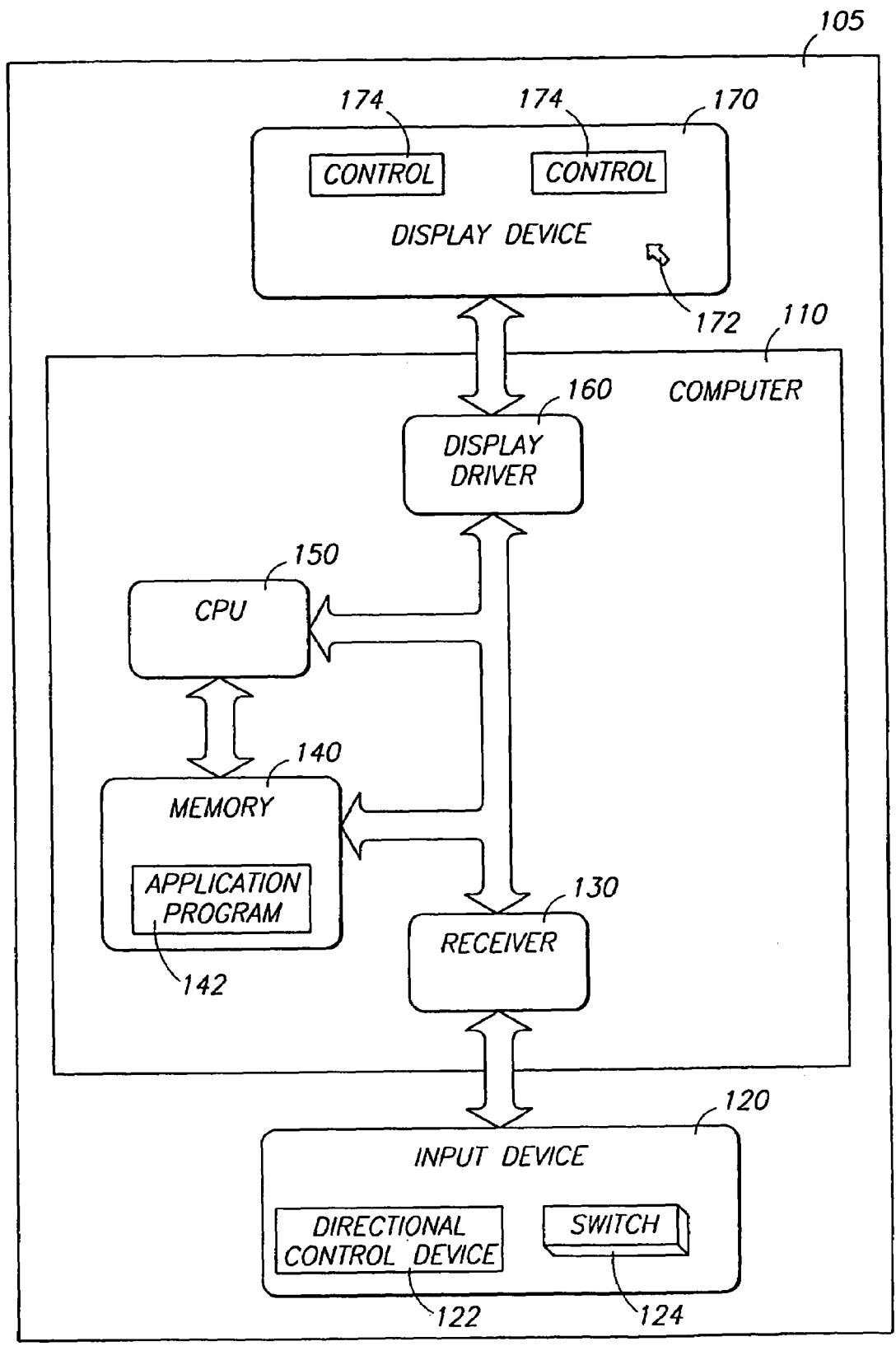
FIG. 1 is a block diagram of a conventional computer system.
Figure 2A:
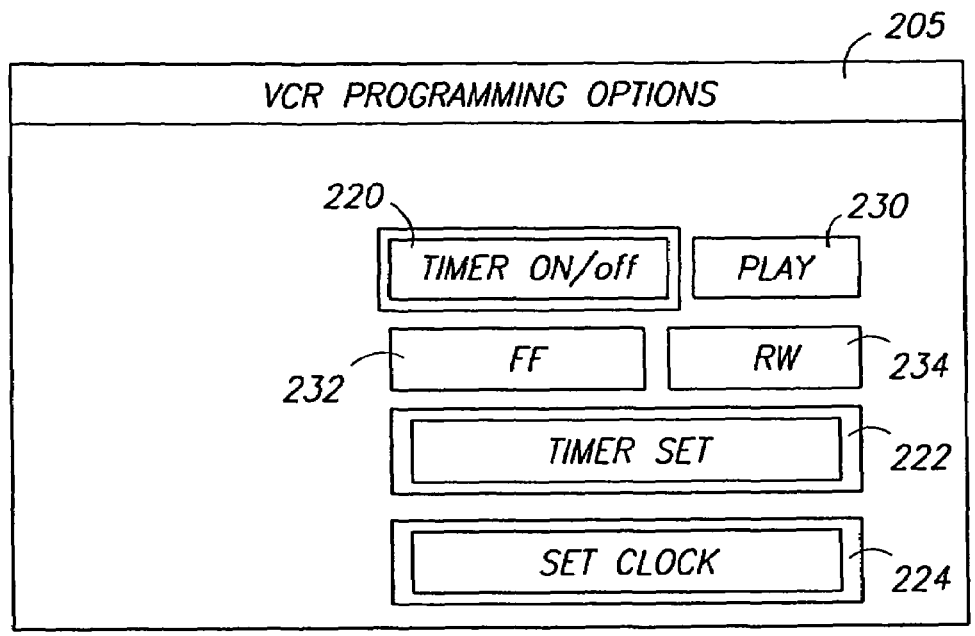
FIG. 2A illustrates a plurality of controls that are displayed on the video display device of FIG. 1.
Figure 2B:
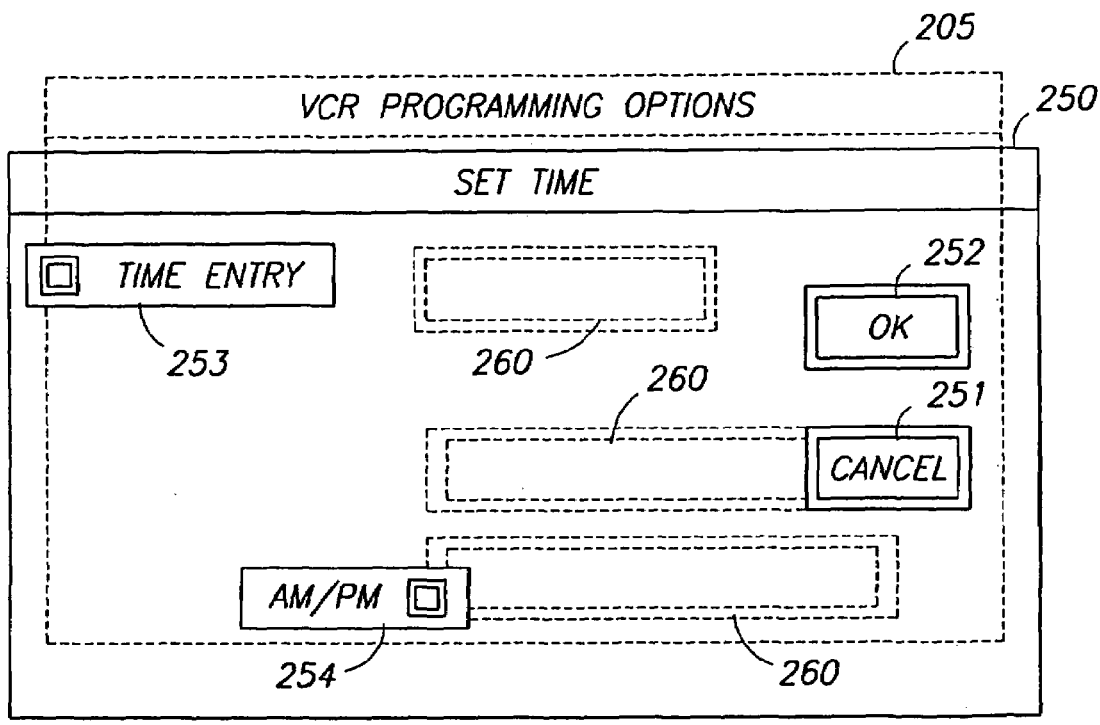
FIG. 2B illustrates the plurality of controls of FIG. 2A after they have been obscured by a subsequently displayed item of data.
Figure 7A:
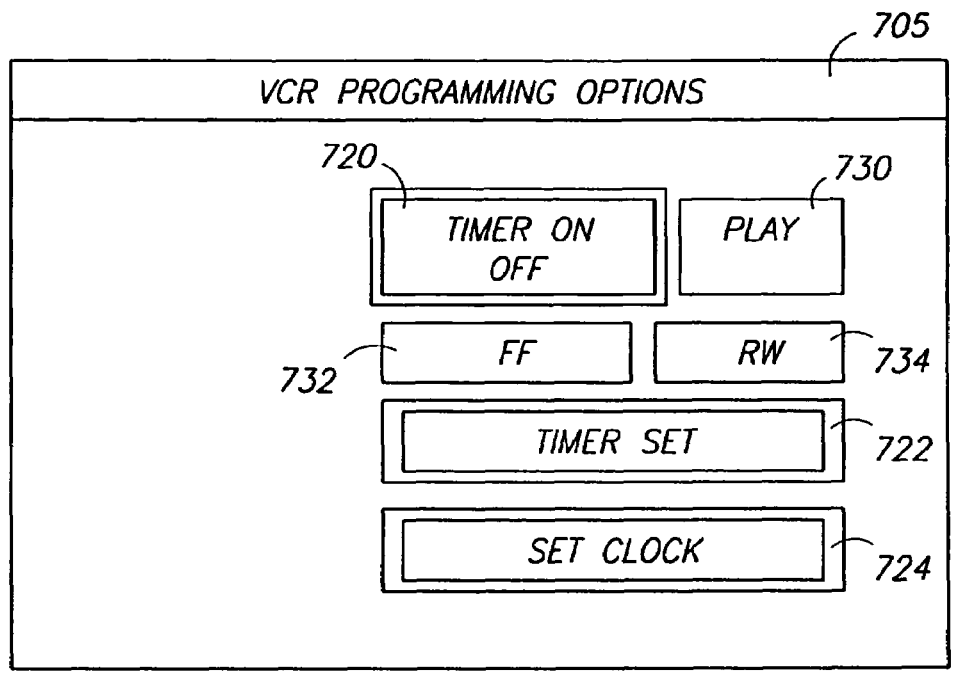
FIG. 7A illustrates the steps performed in a process of activating and deactivating control groupings in the preferred embodiment of the present invention.

The preferred embodiment begins processing by determining if the application program requests to register controls (step 610). The example assumes that a VCR user has just activated a VCR Options Program 346 by depressing a VCR programming option switch on the VCR remote control device. As such, the VCR Options Program 346 generates a VCR Programming Options Window 705 of FIG. 7A on the video display device 370. FIG. 7A illustrates controls in an identical manner to that previously illustrated in regards to conventional systems (FIG. 2A). However, as will be explained below the preferred embodiment of the present invention discloses a novel technique for activating and deactivating the controls of FIG. 7A. After generating the window, the VCR Options Program 346 registers each control (720, 722, 724, 730, 732 and 734) in the VCR programming window 705 with the control manager 345 (step 620).

Figure 8:
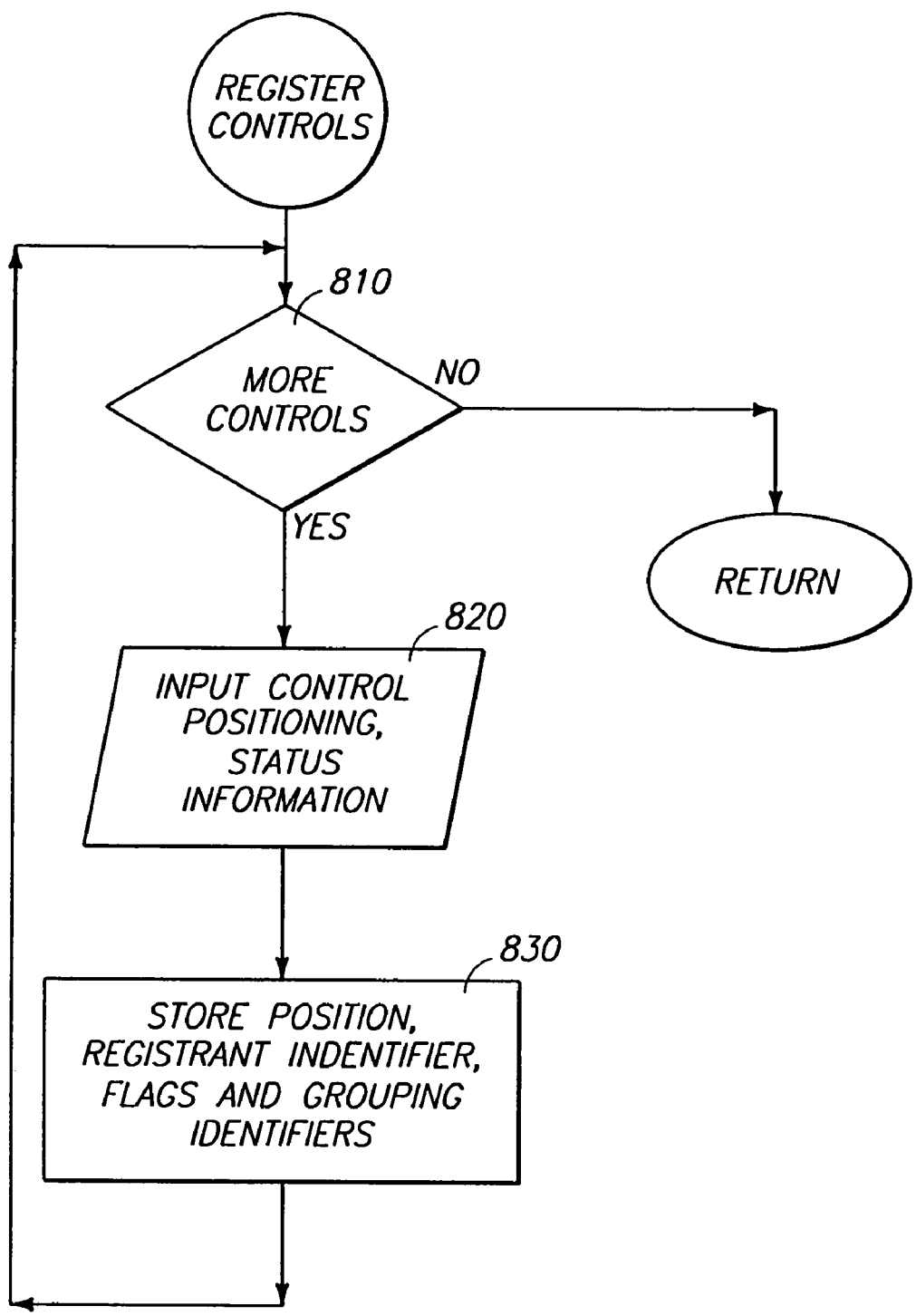
FIG. 8 is a flow diagram illustrating the steps performed in the steps performed in a process for registering controls in the preferred embodiment of the present invention.

The Register Control Program of FIG. 8 accepts controls from an application program 346 and registers them in the data structure 400. The Register Control Program begins by determining if the application program has an additional control to register (step 810). If the application program has an additional control to register, the preferred embodiment inputs the respective control data (step 820). In the example, the preferred embodiment of the present invention inputs control data for the controls (720, 722, 724, 730, 732 and 734) of the VCR Options Program 346 (step 820). The preferred embodiment then registers the controls by storing the inputted control data in the previously described CPSIs 440 (step 830). More specifically, for each control, the preferred embodiment stores a set of Cartesian coordinates which identifies the center of the control in a respective Position Identifier 441. Additionally, the preferred embodiment stores a window handle for each control in the respective Registrant Identifiers 442. A window handle is a numerical identifier that identifies the registering window (i.e., the VCR Programming Options Window 705). By default, the preferred embodiment also sets the Active Flag 443 for each newly registered control. However, the application program 346 can request that this flag be initially reset. Furthermore, the preferred embodiment stores control group numbers for each control in respective Control Group Identifiers 444. These group numbers indicate the control groupings to which the controls belong. As will be explained below, the application may designate a control to be considered as an element of a control grouping at any time. For purposes of example, assume that the VCR Options Program 346 specifies that the Timer ON/OFF control 720, the Timer Set control 722, and the Clock Set control 724, all belong to a first grouping of controls and the Play control 730, the Fast Forward control 732, and the Rewind control 734, all belong to a second grouping of controls. As a result, the Register Controls Program updates the CPSIs 440 to reflect the membership of the controls in their respective groups. In the example, the preferred embodiment of the present invention stores either a one or a two in the Control Group Identifier 444 of each control depending on whether the associated control belongs to the respective first or second grouping. After inputting and storing this data for each control, the Register Control Program of FIG. 8 returns to the Control Manager Program of FIG. 6.

The Control Manager Program of FIG. 6 continues processing by determining if the VCR Options Program 346 has requested to set or modify the parameters used in the Weighted Distance calculation (i.e., the Skip Angle Value 410, the Skip Distance Value 420, and the Angle Importance Weight 430) (step 630). By varying values for these parameters, an application programmer informs the control manager 345 how to determine an ideal resting position for the cursor 372. For example, since the preferred embodiment uses $$\text{Weighted Distance} = \text{Control Distance} + \frac{\text{Control Angle} * \text{Control Distance}}{\text{Angle Importance Value}}$$

to calculate weighted distances, an application programmer can direct the control manager 345 to give predominate weight to controls which lie in proximity to a Last Direction of Cursor Movement Path (as opposed to controls which are angled away from the direction of Last Direction of Cursor Movement Path) by selecting a large Skip Distance Value 420, a small Skip Angle Value 410, and a large Angle Importance Weight Value 430.

Typically, the application programmer heuristically determines values for the above parameters based on the size of the window, the number of controls in the window and the relative locations of the controls to each other. In this case, assume that the application programmer has determined that a Skip Angle Value of 175°, a Skip Distance Value of 450 units, and an Angle Importance Weight Value of 100 represent ideal values for the VCR Programming Options Window 705. The effect of the selection of these values will be discussed in detail below relative to FIGS. 10 and 11. Under these conditions, the preferred embodiment receives the values from the VCR Options Program 346 (steps 630 and 640) and stores the inputted values in their respective locations of the data structure 400 (step 650).

At this point, the Control Manager Program of FIG. 6 determines if it should activate or deactivate any controls (step 660). For purposes of example, assume that the VCR Options Program 346 originally activated all controls of the VCR Programming Options Window 205. Further assume that the user subsequently set a timer of the VCR which renders normal play options (i.e., play, fast forward and rewind) unavailable. In this case, the unavailable options are represented by the controls of the second control grouping (730, 732, and 734). Under these conditions, the VCR Options Program requests deactivation of the second control grouping. As a result, the Control Manager Program transfers control to the Activate/Deactivate Control Program of FIG. 9 (step 670).

Figure 9:
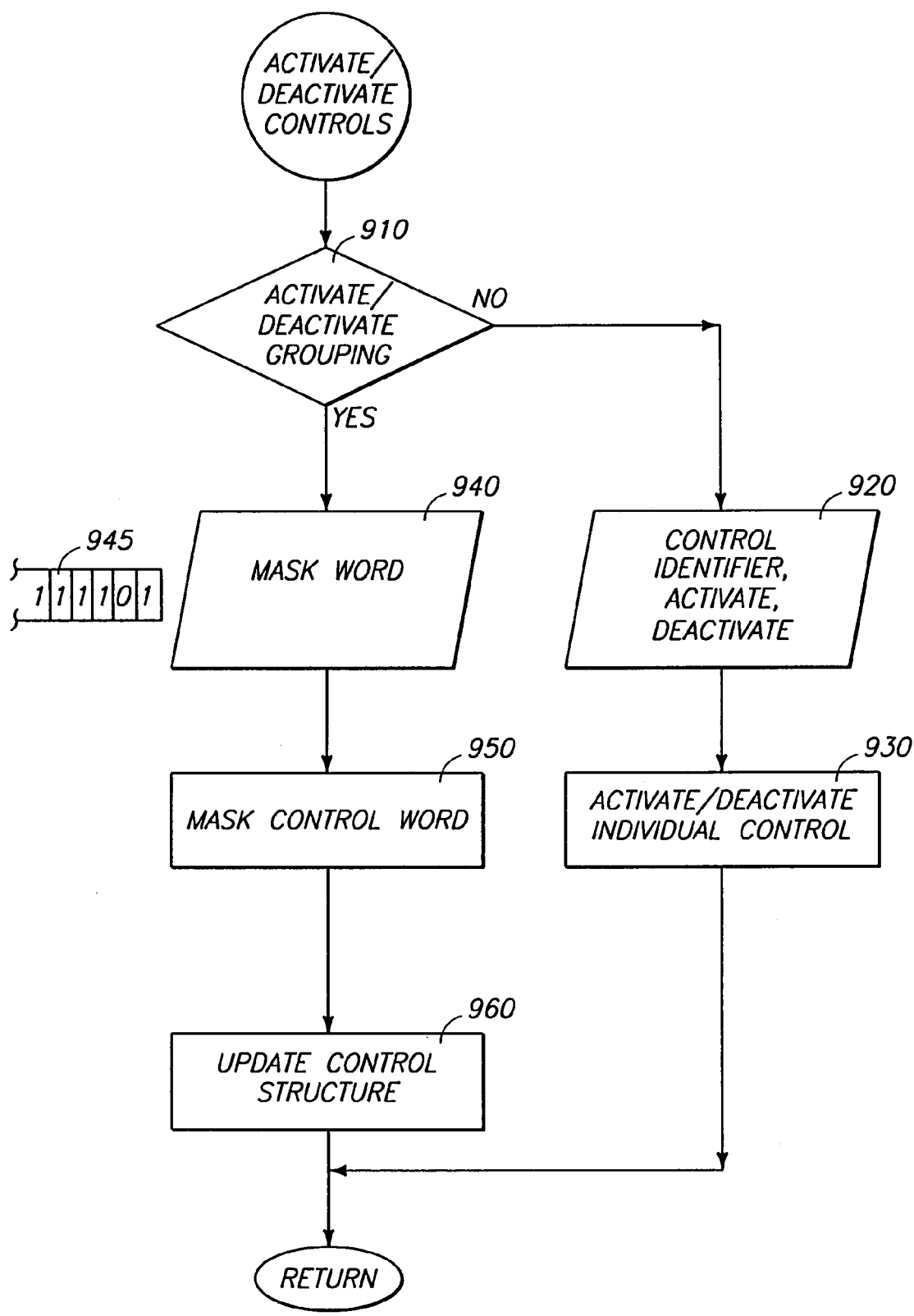
FIG. 9 is a flow diagram illustrating the steps performed in a process for activating and inactivating hot spots in the preferred embodiment of the present invention.

The Activate/Deactivate Control Program of FIG. 9 activates or deactivates controls as requested by the application program. The Activate/Deactivate Control Program expects a mask as input if the application program 346 is requesting to activate or deactivate a grouping of controls. The mask is a grouping of binary numbers which are used to selectively screen out or let through certain bits in the Control Word 405. As will be explained below, the preferred embodiment performs a logical AND operation using the inputted mask and a current value of the Control Word 405 to selectively set or reset the Control Grouping Indicators 406 of the Control Word 405. Alternatively, if the application program is requesting to activate or deactivate an individual control, the Activate/Deactivate Control Program expects (1) control identifier (e.g., a CPSI array element number) and (2) an activate/deactivate flag, as input.

In the example, the preferred embodiment of the present invention determines that the VCR Options Program 346 is requesting to activate or deactivate the second control grouping (step 910). Alternatively, had the application requested to activate or deactivate an individual control, the preferred embodiment of the present invention (1) receives the individual control identifier and the activate/deactivate flag (step 920) and (2) appropriately activates or deactivates the identified control (step 930). Back to the example, the preferred embodiment inputs a mask to deactivate the second control grouping (step 940). For purposes of illustration, assume that the second control grouping is represented by the second bit 406 of a Control Word 405 and that a null value for the bit deactivates a grouping: thus, the inputted mask would appear as represented by 945 in FIG. 9 (i.e., the last four bits of the inputted mask are 1101 or 0xD in hexadecimal notation). Subsequently, the preferred embodiment of the present invention superimposes the inputted mask 945 into Control Word 405 using a logical AND operation (step 950) of FIG. 9. Having masked the Control Word 405 of FIG. 4, the preferred embodiment updates the Active Flag 443 of each CPSI 440 in accordance with the newly masked bit values of the Control Word 405. In this case, the preferred embodiment resets each Active Flag 443 for each CPSI having a control group number of two stored as a Control Group Identifier. Having updated each relevant Active Flag 443, the Activate/Deactivate Controls Program of FIG. 9 returns control the Control Manager Program 6. By representing a grouping of controls as a single bit of the Control Word 405, the preferred embodiment of the present invention provides a convenient method for an application program to activate or deactivate a fraction of its registered controls. By using a mask and a control word, the preferred embodiment allows the application programmer to activate/deactivate the desired fraction controls with a minimum amount of coded instructions (i.e., by merely loading a mask value into a parameter as opposed to individually specifying each control that the application programmer wants activated or deactivated). At this point, the example has demonstrated how the preferred embodiment of the present invention registers controls and quickly deactivates a fraction of formerly activated controls. The example will now demonstrate the innovative automatic positioning technique of the preferred embodiment of the present invention.

Figure 7B:
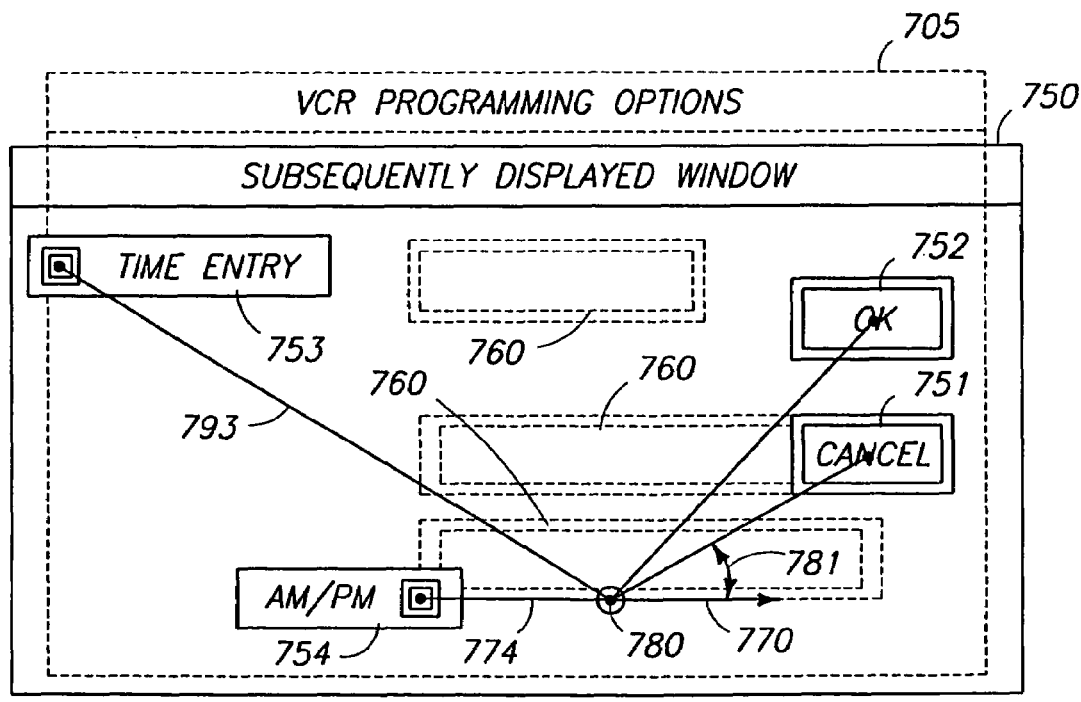
FIG. 7B illustrates the steps performed in a process of positioning a cursor in the preferred embodiment of the present invention.

FIG. 7B represents a display of the video display device 370 of FIG. 3. More specifically, FIG. 7B illustrates the VCR Programming Window 705 of FIG. 7A after it has been obscured by the Subsequently Displayed Window 750 of FIG. 7B. The active controls of FIG. 7A are represented by the controls displayed in phantom form 760 in FIG. 7B. Additionally, assume that the Subsequently Displayed Window 750 contains four active registered controls 751, 752, 753, and 754 (registered and activated in the previously described manner, FIGS. 8 and 10). For purposes of example, assume that the user was moving the cursor in a last direction of movement represented by a Last Direction of Movement Path 770. Additionally, the position on the screen of the video display device 370 at which the user terminated the movement of the cursor is represented by 780 in FIG. 7B. The Control Manager Program of FIG. 6 determines that the user terminated cursor movement by releasing the directional control 322 (step 680) and transfers control to the Position Cursor Program of FIG. 11 (step 690).

Figure 10:
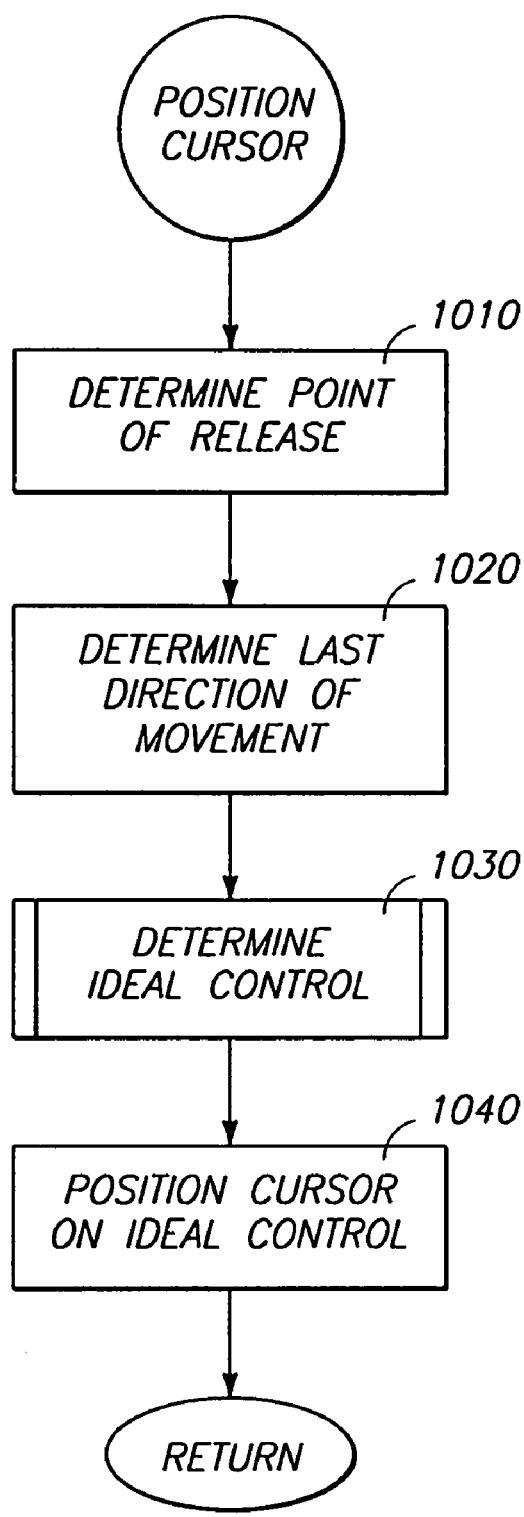
FIG. 10 is a flow diagram illustrating the steps performed in a process for positioning a cursor in the preferred embodiment of the present invention.

The Position Cursor Program of FIG. 10 determines the ideal control to position the cursor on after the user has released a switch of the directional control device 322 (e.g., if the user has released a previously depressed directional arrow button). In the example, the Position Cursor Program begins by determining the Last Cursor Position (e.g., the Cartesian coordinates for the position on the screen pointed to by the cursor when the user released the directional control 322) (step 1010). Additionally, the Position Cursor Program determines a Last Direction of Movement Path for the cursor (step 1020). Typically, both the Last Cursor Position and the Last Direction of Movement Path are readily available as parameters contained within the display driver 360. Having determined the point of release and the Last Direction of Movement Path, the Position Cursor Program calls a Determine Ideal Control Program of FIG. 11 (step 1030).

Figure 11:
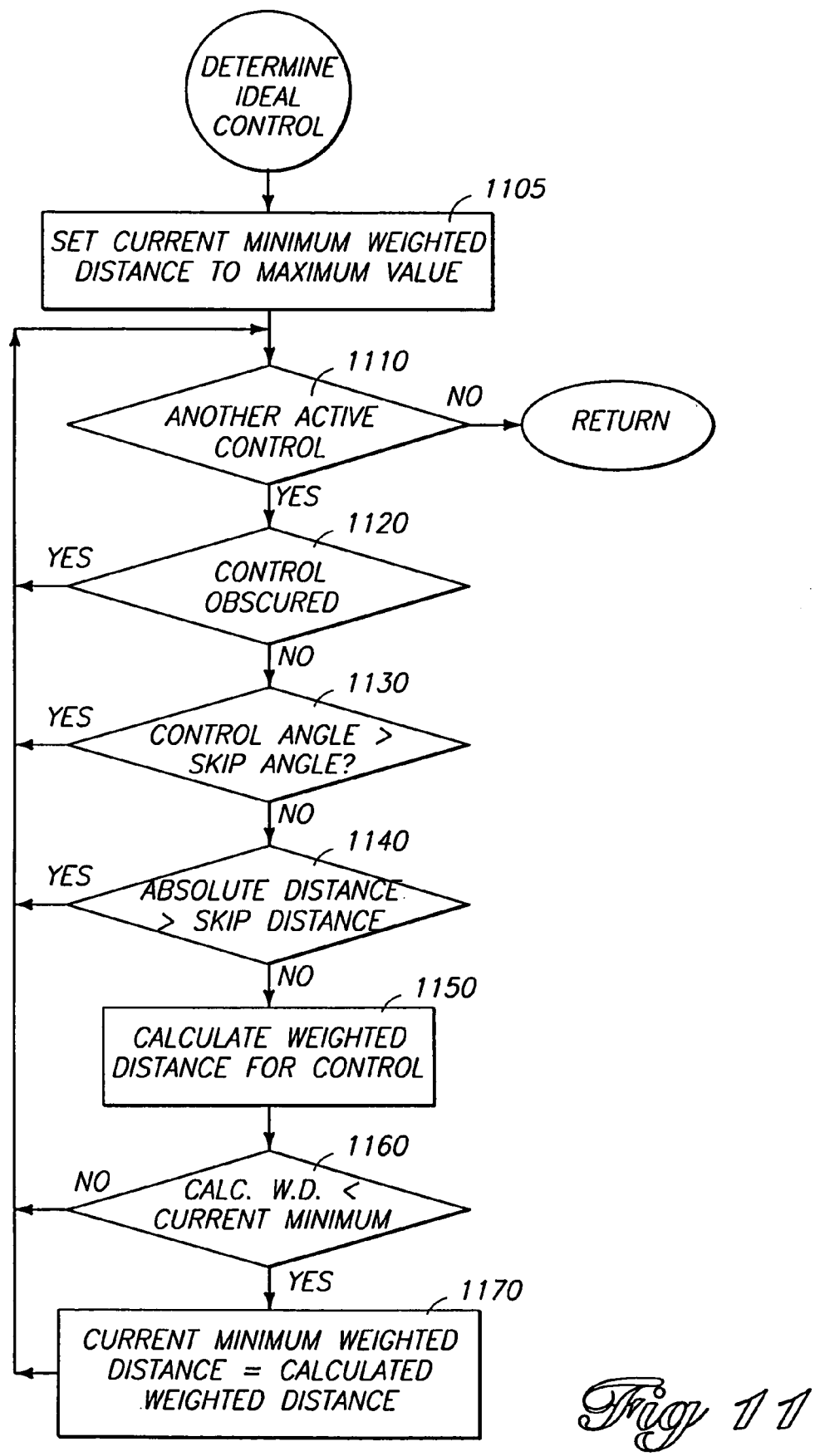
FIG. 11 is a flow diagram illustrating the steps performed in a process for determining the ideal control upon which to position the cursor.

The Determine Ideal Control Program of FIG. 11 determines the optimal control upon which to position the cursor. The preferred embodiment begins the determination process by setting a Current Minimum Weighted Distance Parameter to an arbitrarily large value (step 1105). For purposes of example, assume that the Current Minimum Weighted Distance Parameter is initially set to 65,535. Subsequently, the preferred embodiment examines the positioning and status of each control (steps 1110–1170). In the example, there are seven active controls: the unobscured controls of the Subsequently Displayed Window 750 and the obscured controls 760 of the VCR Programming Options Window 705. In the interests of brevity, the three obscured controls 760 of window 705 will be treated in a single pass of the loop formed by steps 1110 and 1120 of FIG. 11. The preferred embodiment of the present invention determines that controls 760 are obscured by retrieving the Cartesian coordinates stored in the Position Identifier 441 of the CPSI. Having retrieved the Cartesian coordinates, the preferred embodiment of the present invention passes the retrieved coordinates to a Get Window From Point Program. In turn, the Get Window From Point Program returns the active window handle that surrounds the point represented by the passed center coordinate. In the example, the Get Window From Point Program returns the window handle of the Subsequently Displayed Window 750. The preferred embodiment then compares the subsequently displayed window handle with the window handle stored as the Registrant Identifier 442 for the associated control. As previously mentioned, a window handle is a unique numerical identifier of a window. As such, the window handle of the VCR Programming Options Window 705 does not match the window handle of the Subsequently Displayed Window 750. Consequently, the preferred embodiment does not consider any of the obscured controls 760 as valid resting positions for the cursor (steps 1110 and 1220).

Subsequently, the Determine Ideal Control Program examines the AM/PM control 754 of FIG. 7B (steps 1110–1130 of FIG. 11). In this case, however, the angle formed between (1) the Last Direction of Cursor Movement Path 770 and (2) the AM/PM Control Path 774, is equal to 180°. As previously discussed, the application programmer specified the skip angle to be 175°. Therefore, the preferred embodiment does not consider the AM/PM control 754 as a valid resting position for the cursor (steps 1110 and 1130 of FIG. 11).

At this point, the Determine Ideal Control Program of FIG. 11 examines the Time Entry control 753 of FIG. 7B. In this case, the preferred embodiment determines that the associated absolute distance 793 for the Time Entry control 753 is equal to 500 units (step 1140). Thus, the absolute distance to the Time Entry control is greater than the skip distance value of 450. As a result, the Determine Ideal Control Program does not consider the Time Entry control 753 as a valid resting position for the cursor.

Additionally, the Determine Ideal Control Program of FIG. 11 examines the OK control 752 and the Cancel control 751 of FIG. 7B (steps 1110–1170). In contrast to the previously examined controls, these two controls are neither obscured or out or respective distance or angle ranges. Therefore, the preferred embodiment Position calculates the weighted distance for these two remaining control candidates (step 1150). More specifically, assuming that the Control Angle 781 for the Cancel control 751 is equal to 20° and that the absolute distance connecting the point of release 780 with the center of the Cancel control 751 is 300 units, the associated Weighted Distance equals 360. [Weighted distance=Absolute Distance+Control Angle/Weight Angle× Absolute Distance=300+(20*300)/100=360] (step 1150). Since the Cancel control has an associated weighted distance which is less than the value (65,535) held in the Current Minimum Weighted Distance Parameter (step 1160), the preferred embodiment sets the Current Minimum Weighted Distance Parameter to the Weighted Distance associated with the Cancel control 751 (step 1170). Similarly, assuming that the associated absolute distance for the OK control 752 of FIG. 7B is 400 units and the associated weight angle is 45°, the preferred embodiment calculates an associated weighted distance of 580 (steps 1110–1150). In this case, however, the calculated weighted distance is not less than the value held in the Current Minimum Weighted Distance Parameter (step 1160). Therefore, the Determine Ideal Control Program returns to the Position Cursor Program of FIG. 10 with the Cancel control 751 of FIG. 7B identified as the control having the smallest associated weighted distance. At this point, the Position Cursor Program positions the cursor on the Cancel control 751 (step 1040). In this manner, the preferred embodiment of the present invention automatically places a cursor on an ideal control. By determining an ideal control in this fashion, the preferred embodiment allows the user to easily navigate between controls using only a crude positioning device. For example, using either a four-arrow keypad or a joystick, the user can effectively jump to a desired control by only momentarily activating the directional control device in the direction of the desired control.

As explained above, the preferred embodiment of the present invention determines the ideal control after the user has released the directional control. However, those skilled in the art will appreciate that the preferred embodiment can be easily modified to determine the ideal control while the user is moving the cursor. In this alternative embodiment, the present invention periodically calculates the weighted distances of the controls and designates the control having the smallest weighted distance as a current ideal control. The alternative embodiment then positions the cursor on the current ideal control when the user releases the directional control device.

Additional advantages of, and modifications to, the preferred embodiment of the present invention will readily appear to those skilled in the art. Therefore, the broader aspects of the present invention are not limited to the specified details of the described preferred embodiment. Accordingly, various modifications may be made to the preferred embodiment without departing from the spirit and scope of the present invention. As such, the present invention is only limited by the appended claims and their equivalents.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. In a computer system having a video display device, the video display device having a screen, a method comprising:
   providing a plurality of controls on the screen of the video display device;

identifying a control group, the control group being comprised of at least two controls associated in a data structure;
   representing the control group with a single status indicator in the data structure, where the single status indicator is a bit of a control word that represents the at least two controls of the control group; and
directing the activation of the controls of the control group by storing an active value in the single status indicator.

2. The method of claim 1, further comprising directing the activation of individual controls by storing an active value in a status indicator for each control.

3. The method of claim 1, further comprising directing the deactivation of the controls of the control group by masking the active value in the single status indicator.

4. The method of claim 1, further comprising:
   directing the deactivation of the controls of the control group by masking the active value in the single status indicator; and
directing the activation of the controls of the control group by storing an active value in a status indicator for each control.

5. In a computer system having a video display device, the video display device having a screen and the computer system including a cursor which is displayed on the screen, a method comprising:
   providing a plurality of controls on the screen of the video display device;
   identifying a control group, the control group being comprised of at least two controls associated in a data structure;
      representing the control group with a single status indicator in the data structure;
         directing the activation of the controls of the control group by storing an active value in the single status indicator;
   identifying a location on the screen that the cursor points to; and
   for each control of the control group, identifying a control position, the control position defining a location on the screen for the activated control, determining a control distance, the control distance defining a control connecting path which connects the identified location with the control position, calculating a control angle, the control angle being an angle formed between the control connecting path and a last direction of cursor movement path, and calculating a weighted distance.

6. An apparatus for activating and deactivating a control grouping, the control grouping being comprised of at least two controls and being displayed on a screen of a video display device of a computer system, the apparatus including:
   a memory formed within the computer system;
   a control grouping identifier contained within the memory, wherein the control grouping identifier has an active state and an inactive state and wherein the control grouping identifier is a bit of a control word that represents the controls of the control grouping; and
   an identifier for an individual control contained within the memory, the identifier for the individual control having an active state and an inactive state.

7. An apparatus for activating and deactivating a control grouping, the control grouping being comprised of at least two controls and being displayed on a screen of a video display device of a computer system, the apparatus including:
   a memory formed within the computer system; and
   a control grouping identifier contained within the memory, wherein the control grouping identifier has an active state and an inactive state and wherein the control grouping identifier is a bit of a control word that represents the controls of the control grouping.

* * * * *